United States Patent [19]
Reihl et al.

[11] Patent Number: 5,775,769
[45] Date of Patent: Jul. 7, 1998

[54] MOTOR VEHICLE ROOF

[75] Inventors: Peter Reihl, Starnberg; Bernhard Wingen, Feldkirchen; Wolfram Salz, Bochum; Johann Mayer, Petershausen; Martin Danzl, München; Arpad Fürst, Germering; Thomas Zirbs, Weil der Stadt, all of Germany

[73] Assignee: Webasto Karosseriesysteme GmbH, Stockdorf, Germany

[21] Appl. No.: 625,319

[22] Filed: Apr. 1, 1996

[30] Foreign Application Priority Data

Apr. 1, 1995 [DE] Germany .................. 195 12 342.5

[51] Int. Cl.⁶ ........................................ B60J 7/05
[52] U.S. Cl. ................................. 296/216; 296/221
[58] Field of Search .......................... 296/216, 221, 296/223

[56] References Cited

U.S. PATENT DOCUMENTS 4,911,497  3/1990  Schreiter et al. .................. 296/222

FOREIGN PATENT DOCUMENTS

| 11 99 638 | 8/1965 | Germany . |
| 3100757 | 12/1981 | Germany .................. 296/216 |
| 38 07 961 | 7/1990 | Germany . |
| 4078617 | 3/1992 | Japan .................. 296/216 |

Primary Examiner—Denis H. Pedder
Attorney, Agent, or Firm—Sixbey, Friedman, Leedom & Ferguson; David S. Safran

[57] ABSTRACT

A motor vehicle roof with a cover (3) which can be activated by means of cover mechanism (6) and which selectively closes an opening (2) in a fixed roof surface (1) or at least partially exposes the opening (2) by being raised at its rear edge, achieves increased safety against the cover being forced out to the top and enables the vehicle roof to be configured so as to eliminate height adjustment, by the cover (3) resting in the closed state with both its front edge (4) and its rear edge (5) underlying the fixed roof surface (1). Advantageously, a pretensioning force is exerted by the cover (3) on the fixed roof (1), so that one of these two parts impresses its outline on the other.

16 Claims, 4 Drawing Sheets

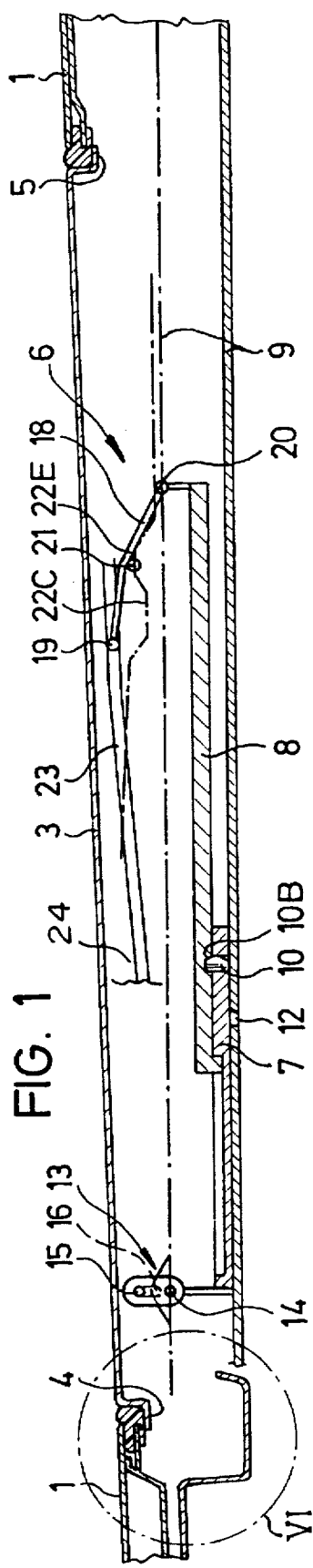
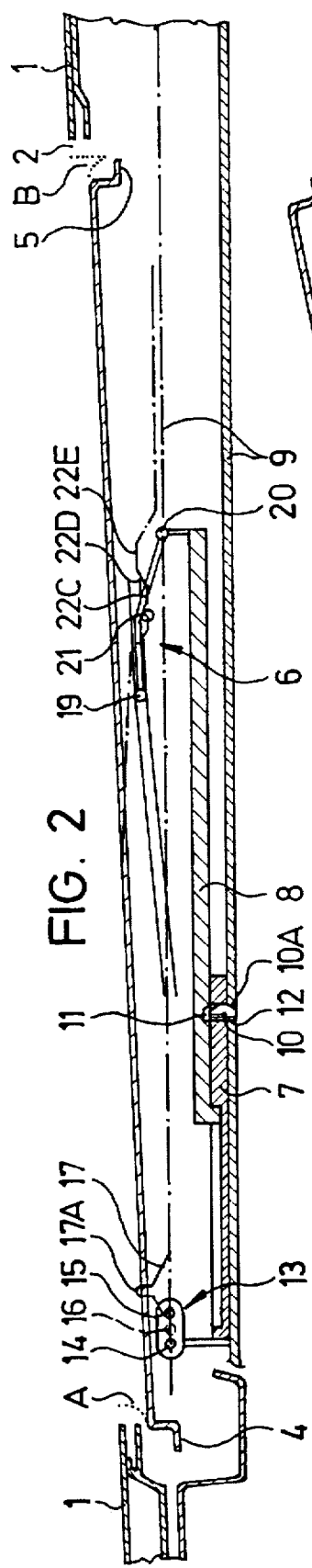
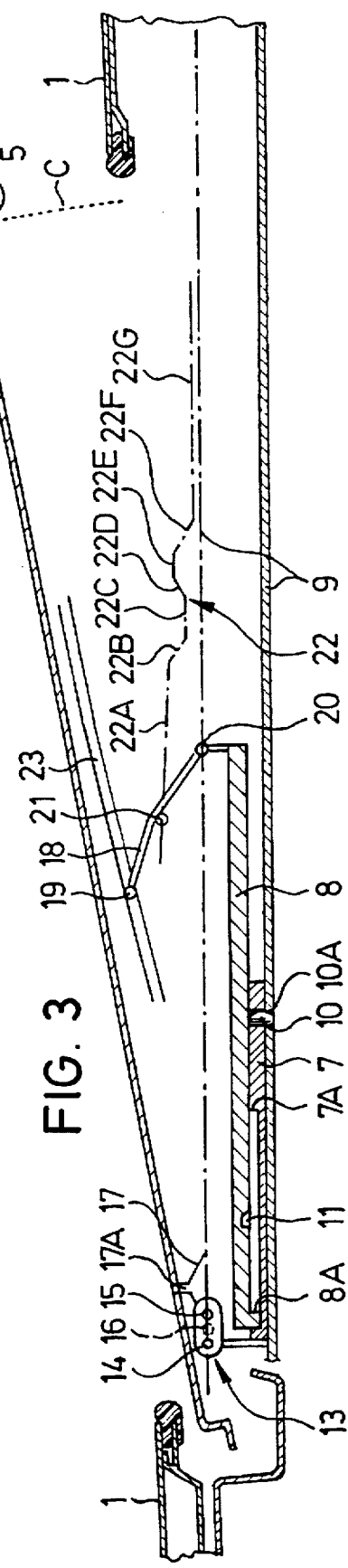

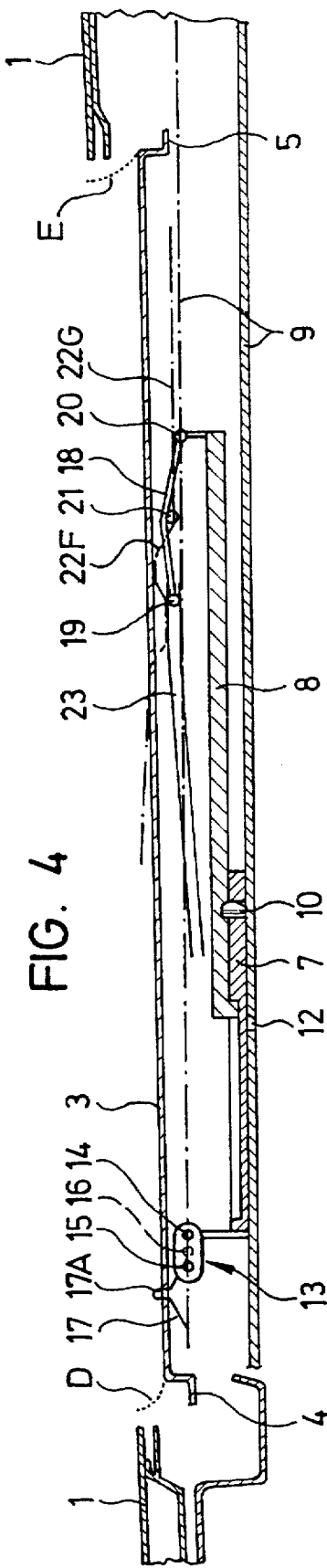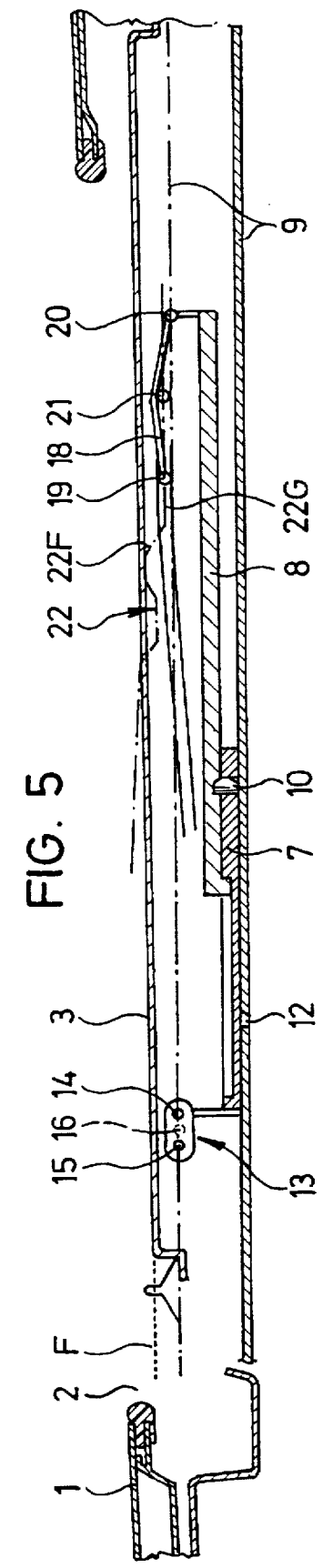

MOTOR VEHICLE ROOF

BACKGROUND OF THE INVENTION

1. Field of the Invention

The invention relates to a motor vehicle roof with a cover which can be activated by means of a cover movement mechanism, which selectively closes a roof opening or at least partially exposes it by being raised its rear edge, and at least one edge of which rests under the fixed roof cover in the closed state.

2. Description of Related Art

A vehicle roof of the above-mentioned type is known from published German Application No. 11 99 638. In this vehicle roof, in the closed position, the front edge of the cover extends under the front edge of the fixed roof surface. The rear edge of the cover, on the other hand, sits on top of a seal which is joined to the fixed vehicle roof. The safety of this cover against being forced out in an upward direction is, thus, determined solely by the cover movement mechanism.

From German Patent No. 38 07 961 and corresponding U.S. Pat. No. 4,911,497, a ventilator roof for motor vehicles is known in which the cover fits underneath the fixed vehicle roof in the closed position at both its front and rear edges. This cover does exhibit high safety against being forced out in an upward direction; however, it does not offer the possibility of a ventilator position in which the rear edge of the cover is raised above the fixed vehicle roof.

SUMMARY OF THE INVENTION

The primary object of the present invention is to make available a motor vehicle roof in which the rear edge of the cover can be raised and in which there is still a high degree of safety against the roof being forced out in the closed position.

This object is achieved by enabling the cover to engage under the fixed roof in its closed position. Because the cover rests in the closed state with its front edge and its rear edge under the fixed roof surface, the cover is prevented on two opposite sides from undesirable penetration through the roof opening. Likewise, this cover can be raised with its rear edge above the fixed vehicle roof into a ventilator position after lowering and shifting of its front edge forward by a suitable mechanism.

According to one especially advantageous embodiment, the front edge and/or rear edge of the cover exerts a pretensioning force on the fixed roof covering. In this way, it becomes possible that, by preselecting the stiffnesses of the parts pressed against one another, the stiffer part impresses a predetermined outline on the less stiff part. As a result, the adjustment efforts necessary, conventionally, in the installation of a vehicle roof to adjust the height of the cover can be eliminated. As a first possible advantageous alternative, the cover has a higher stiffness in the area of its front edge and/or rear edge than the areas of the fixed roof which they border. In this embodiment, the stiffer cover impresses its outline on the intentionally softer fixed roof covering so that, in the closed position, the entire roof offers a smooth appearance.

According to another advantageous embodiment, the cover has less stiffness in the area of its front edge and/or its rear edge than the areas of the fixed roof which they border. In this case, the parts of the roof which are bordered by the cover, which has been made intentionally softer, impress their outline on it so that, with the cover closed, a smooth closed appearance of the vehicle roof is presented overall.

As alternatives, mixed forms are also conceivable; for example, a more rigid front part of the cover can interact with a fixed roof that is covering made softer in the area of the front edge of the roof opening, and at the same time, a rear edge of the cover which is made softer can interact with a more rigid part of the fixed roof which overlays it or vice versa.

In any case, it is advantageous if the pretensioning force is applied by means of the cover mechanism. In this way, the forces derived from the drive can be used to directly produce the necessary contact pressure and no additional pressure means are necessary.

According to one advantageous embodiment, it is provided that the cover mechanism lowers the cover at the start of an opening movement simultaneously, at both the front edge and the rear edge. This simultaneous lowering acts, advantageously, to reduce wear on the seals located between the cover and fixed roof in the area of the front edge and the rear edge. After the lowering process, it is advantageous if the cover then moves forward, and subsequently, the rear edge is lifted. In this way, on the one hand, it becomes possible that the rear edge of the cover is raised above the fixed roof, and on the other, in an interim stage, an additional ventilation possibility in the area of the rear edge of the cover is established without the covering already having been raised above the fixed roof covering.

Advantageously, the cover mechanism has a front and a rear slide element which can be moved on guide rails attached to the roof on both sides of the cover in the conventional manner. The front and the rear slide element, in this case, can be advantageously coupled to one another by means of a locking block and can be decoupled during the swinging motion of the rear edge of the cover. It is especially advantageous if, in doing so, the locking block automatically couples the front slide element to a part which is mounted on the fixed roof, for example, the guide rail, during swinging motion of the rear edge of the cover.

According to another advantageous feature, the cover mechanism has a front pivot lever which is pivotally joined at its upper end with the cover, is pivotally connected at its lower end to the front slide element, and between its ends, has a control pin which engages, at least in phases, a control cam which is not parallel to the outline of the guide rails.

The cover mechanism, furthermore, comprises a rear pivot lever, the upper end of which fits into a crank slot secured to the cover and a rear end of which is pivotally connected to the rear slide element. Furthermore, a control pin is located between the ends of the rear pivot lever and at least temporarily engages a control cam which is not parallel to the outline of the guide rails. By providing control cams for the cover mechanism which are secured to the front and back of the roof, only relatively light mechanism parts, such as levers or pins, are required as moving parts on the cover itself, so that the mass of the parts to be moved overall is reduced.

According to another advantageous aspect of the invention, the upper ends of the pivot levers are connected to side cover carriers, and between them and a inner headliner located under the cover, there is an elastically prestressed screw connection for changing the distance of these parts. By means of this elastically prestressed screw connection, subsequent adjustment of the cover, especially in the area of the side edges, is possible, and due to the cover extending under the fixed roof edges, no adjustment of the outlines of the cover and the fixed roof covering can necessarily be produced.

3

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a schematic longitudinal section through a vehicle roof in the area of the guide rails in the closed position of the cover;

FIG. 2 is a representation according to FIG. 1 with the cover lowered to prepare for the raising process;

FIG. 3 shows a view according to FIG. 1 with the cover raised;

FIG. 4 shows a view according to FIG. 1 with a cover lowered to prepare for retraction;

FIG. 5 shows a view according to FIG. 1 with a cover partially retracted to the rear under the fixed vehicle roof;

DETAILED DESCRIPTION OF THE PREFERRED EMBODIMENTS

Figure 6:
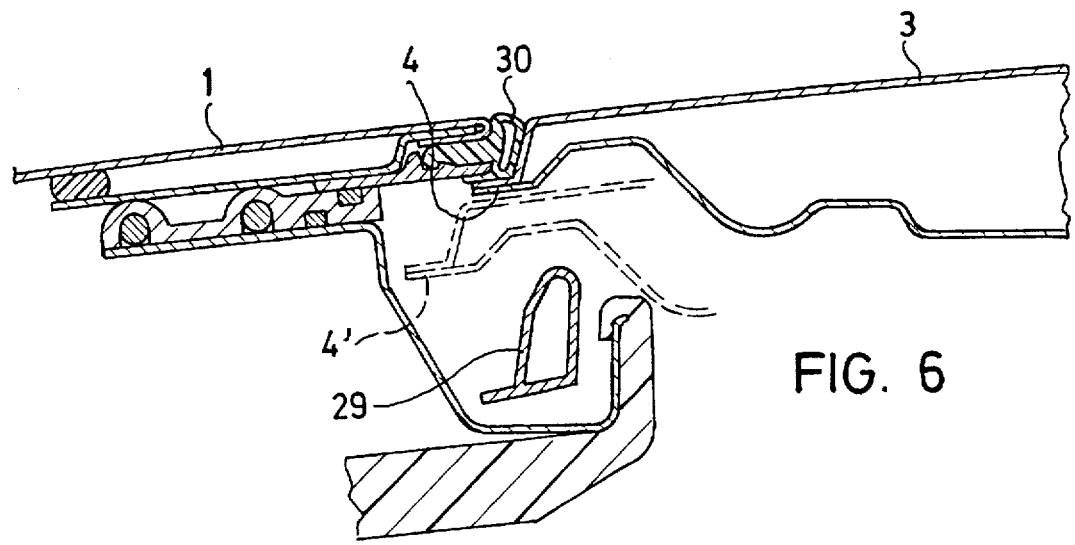
FIG. 6 shows an enlarged view of encircled detail VI in FIG. 1 in the area of the front edge of a rigid cover and an elastic roof covering.

A vehicle roof has a fixed roof 1 in which there is roof opening 2. Roof opening 2 can be closed by a cover 3. In the closed position, front edge 4 and rear edge 5 of the cover 3 rest against the underside of fixed roof 1. By means of a cover movement mechanism labelled 6 as a whole, contact pressure of cover 3 against fixed roof 1 is produced.

Cover 3 is joined in the area of its front edge to a front slide element 7 and in the area of its rear edge to a rear slide element 8, both of which are supported to move lengthwise in guide rails 9 which are located parallel to one another on opposite lateral sides of roof opening 2 and extended in the longitudinal direction of the vehicle. The front slide element 7 and rear slide element 8 can be disengage ably coupled to one another by means of locking block 10, so that by means of a drive cable (not shown), the drive forces which are routed into rear slide element 8 also act on front slide element 7.

Locking block 10 is movably supported in a recess of front slide element 7, the recess running perpendicularly with respect to guide rail 9. With cover 3 closed (FIG. 1) block 10 joins front slide element 7 to rear slide element 8 by its upper part fitting into a recess 11 of the rear slide element 8. In a lowering motion of cover 3 to prepare for the raising process (FIG. 2), the coupled slide elements 7 and 8 move into a position on guide rail 9 in which locking block 10 comes to rest above a recess 12 which is provided in guide rail 9. As rear slide element 8 continues to move forward, by a control surface 10B which is sloped obliquely downward to the rear at its top, locking block 10 is pressed downward into a recess 12 by a likewise sloped control surface of recess 11, as a result of which rear slide element 8 is decoupled from front slide element 7, and at the same time, front slide element 7 is coupled to the guide rail 9 which is secured to the roof. In this way, when rear edge 5 of cover 3 is raised (FIG. 3), a pivot axis (lower coupling point 14 of front pivot lever 13 which is located in the area of front edge 4 of the cover) is held in a stable position with respect to the fixed vehicle roof.

When rear slide element 8 moves rearward from the position shown in FIG. 3, via the position shown in FIG. 2, into the closed position according to FIG. 1, a stop 8A on rear slide element 8 engages a stop 7A on the front slide element, and by means of a control surface 10A which rises obliquely to the rear and which is located on the lower end of locking block 10 and interacts with a likewise sloped control surface of recess 12, locking block 10 is raised upward from recess 12 and is inserted into the recess 11 on rear slide element 8 when it reaches the position shown in FIG. 2. As a result, the front slide element 7 and the rear slide element 8 are, in turn, reconnected. Front slide element 7 and rear slide element 8 remain in this coupled state even when cover 3 is lowered (FIG. 4) and when cover 3 is then displaced to the rear under the fixed roof 1 (FIG. 5).

Lowering mechanism 6 of cover 3, in the area of front edge 4 of the cover, comprises a front pivot lever 13 which is pivotally connected to front slide element 7 at a lower coupling point 14. Front pivot lever 13 is, furthermore, pivotally connected at an upper coupling point 15 to cover 3 or a part which is securely connected to it. Between the lower coupling point 14 and upper coupling point 15, the front pivot lever 13 has a control pin 16 which engages a control cam 17 which is secured to the roof. Control cam 17 has an inverted funnel-shaped cross section with a flank which slopes forward connected to a flank which slopes rearward by a rounded part. Furthermore, this rounded part of control cam 17 forms an inverted U-shaped recess 17A which is open downward and which is likewise located securely on the roof. With the cover closed (FIG. 1), the pin-shaped upper coupling point 15 of front pivot lever 13 engages this recess 17A. At the same time, control pin 16 is at the highest point of the rounded part of control cam 17. When front slide element 7, driven by rear slide element 8, is pushed forward from the position shown in FIG. 1 into the position shown in FIG. 2, lower coupling point 14 of front pivot lever 13 is moved forward on a path parallel to guide rail 9. The control pin 16 passes the forward sloping flank of control cam 17 and tips front pivot lever 13 into a position sloped upwardly to the rear, and at the same time, upper connecting point 15 disengages from recess 17A. When the position shown in FIG. 2 is reached, front pivot lever 13 has been swung from the original vertical orientation into a roughly horizontal position in which lower coupling point 14, control pin 16 and upper coupling point 15 lie roughly at the same height. When the front slide element moves back into the closed position according to FIG. 1, control pin 16 provides for raising of the front pivot lever 13 and reliable insertion of upper coupling point 15 into recess 17A by passing along the rising front flank of control cam 17.

When front slide element 7 moves from the closed position (FIG. 1) into a lowered position for preparation of displacement of cover 3 to the rear under the fixed roof covering (FIG. 4), lower coupling point 14 is drawn to the rear from the position shown in FIG. 1 by the front slide element. In this case, the control pin 16 passes along the flank of control cam 17 which slopes downwardly to the rear, and in doing so, removes upper coupling point 14 from recess 17A, at the same time. In the completely lowered state of cover 3, front pivot lever 13 assumes a position in which is extends forward, roughly horizontally, with upper coupling point 15, control pin 16 and lower coupling point 14 lying at roughly the same height. Front pivot lever 13 stays in this position during movement of the cover 3 to the rear under the fixed roof (FIG. 5). When the cover moves from the rear into the closed position, the control pin 16 passes along the rear flank of control cam 17 which rises to the front, and in doing so, raises front pivot lever 13 forward, at the same time reliably re-inserting upper coupling point 15 into recess 17A.

In the rear area, cover mechanism 6 surrounds rear pivot lever 18, an upper coupling point 19 of which fits, by pivoting or displacement, into a crank slot 23 which is provided on cover 3 or on a part which is securely joined to cover 3, such as the cover carrier 24 described below. Rear pivot lever 18 is, furthermore, pivotally connected by a lower coupling point 20 to rear slide element 8. Between upper coupling point 19 and lower coupling point 20, rear pivot lever 18 has a control pin 21 which engages a control cam 22 which is secured to the fixed roof. Control cam 22 has sections 22A to 22G which are variously sloped. First section 22A, which lies forwardmost in the direction of forward travel, has a straight outline which is sloped slightly downward to the rear. Section 22A passes into a short section 22B which has a greater downward slope toward the rear. Section 22B is adjacent to a section 22C which lies parallel to guide rail 9. Section 22C passes into a short sloping section 22D which rises to the rear and which adjoins a short section 22E which is also parallel to guide rail 9. The section 22E is followed by a section 22F which has a steep slope downwardly to the rear and which finally passes into a section 22G which is lower than section 22C, but which is, likewise, parallel to guide rail 9.

In the closed state of cover 3 (FIG. 1), control pin 21 is in the area of section 22E of control cam 22 and upper coupling point 19 is in the rear area of crank slot 23. In the transition from the position shown in FIG. 1 into the position shown in FIG. 2, the rear slide element 8 is moved forward by the cover drive (not shown), and by which, at the same time, lower coupling point 20 is moved forward by an amount. Control pin 21, in doing so, first passes forwardly along section 22D and then along horizontal straight section 22C of control cam 22. The upper coupling point 19 moves forward in this case, at the same time, in crank slot 23 by a corresponding amount. By means of the simultaneous lowering of front edge 4 of cover 3, which was described above, by means of front pivot lever 13, a superimposed movement is generated which produces a curved lowering of front edge 4 of the cover according to dotted path A in FIG. 2. Rear edge 5 of cover 2, in doing so at the same time, executes a lowering motion and then a swinging motion according to the path B which is shown by the dotted line in FIG. 2.

For subsequently raising rear edge 5 of cover 3 above fixed roof 1 (FIG. 3) along curved path C, the lower coupling point 20 of rear pivot lever 18 is moved by rear slide element 8 an additional amount forward. In doing so, at the same time, control pin 21, in succession, first passes downward along sloped section 22B and then the longer, however, more flatly sloped section 22A of control cam 22. Upper coupling point 19 of pivot lever 18, at the same time, slides further forward in crank slot 23, and thus, raises cover 3 at its rear edge 5. When the rear edge of the cover is lowered from the position shown in FIG. 3 into the closed position according to FIG. 1, all of the aforementioned movements take place in the reverse order.

When cover 3 is lowered to prepare for a displacement process to the rear, lower coupling point 18 is moved by an amount to the rear by means of rear slide element 8 proceeding from the closed position according to FIG. 1 into that of FIG. 4. In doing so, control pin 21 proceeds from its position in section 22E, along section 22F and then along horizontal section 22G of control cam 22. Rear pivot lever 18 is moved into an almost horizontal position, which is sloped forward, in doing so. At the same time, upper coupling point 19 of rear pivot lever 18 slides in crank slot 23 to the rear, and in doing so, lowers rear edge 5 of cover 3 under fixed roof 1. The curved path of cover rear edge 5 produced in doing so is represented with a dotted line E in FIG. 4. The curved path produced, at the same time, by front edge 4 is likewise represented with a dotted line D. In this position, the cover drive continues to move rear slide element 8 and front slide element 7, which is coupled to it by means of locking block 10, so that the rear edge 5 and the forward edge 4 of the cover move to the rear on a path parallel to guide rail 9. This is represented in FIG. 5 by the dotted line F.

Figure 7:
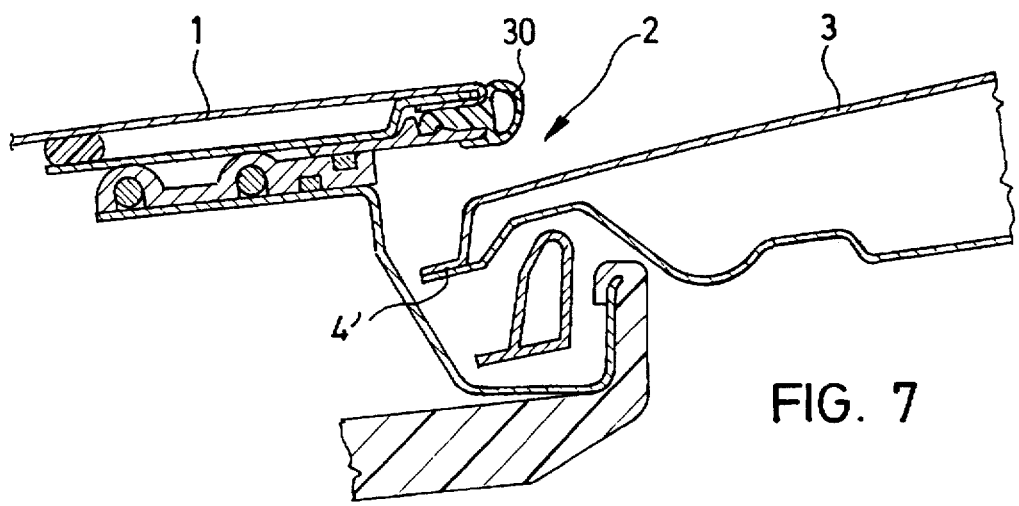
FIG. 7 shows a view according to FIG. 6 with a lowered front edge of the cover pushed forward.

In the partial longitudinal cross section according to FIG. 6, in a first embodiment, the forward edge area of cover 3 is made relatively stiff and the area of fixed roof 1 under which cover 3 rests in the closed state is made relatively elastic. In this case, cover 3, by means of contact pressure produced directly by raising mechanism 6 exerts a force which acts on the underside of fixed roof 1 in the area of seal 30. As a result, roof 1 is caused to match the contour of cover 3. The front edge of the cover 3 is also shown in the lowered state in which it is moved forward as shown in FIG. 2 by the broken line and in FIG. 6 by 4'. Under the front edge 4 of cover 3 is a wind deflector 29 which takes effect only when cover 3 is moved to the rear according to FIGS. 4 and 5, and this wind deflector 29 is raised above fixed roof 1 in a conventional manner at the front edge of roof opening 2. The view in FIG. 7 corresponds to the position of forward edge 4 of the cover 3 which is shown in FIG. 3, and in which the front edge of the cover is labelled 4'in correspondence with the lowered position in FIG. 6. Instead of an arrangement of seal 30 on the fixed vehicle roof, alternatively, a seal can be arranged on cover 3 (see FIG. 8).

Figure 8:
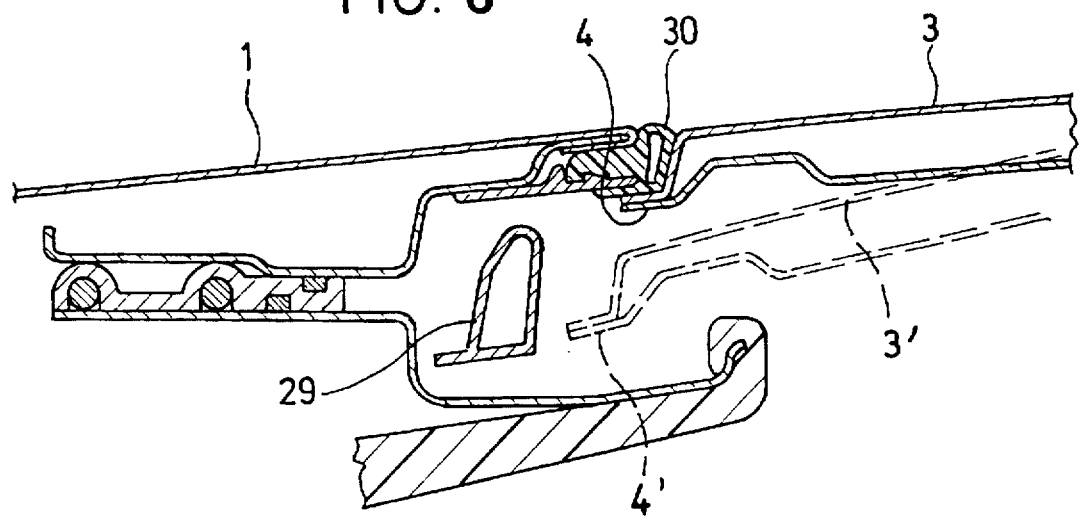
FIG. 8 shows one alternative to FIG. 6 with a stiff roof covering and soft front edge of the cover.

In the alternative embodiment according to FIG. 8, cover 3 is made softer than the overlying part of fixed roof 1. Due to its greater stiffness, roof 1 impresses its contour on cover 3 when it is pressed by cover mechanism 6 upward against the fixed roof 1.

Figure 9:
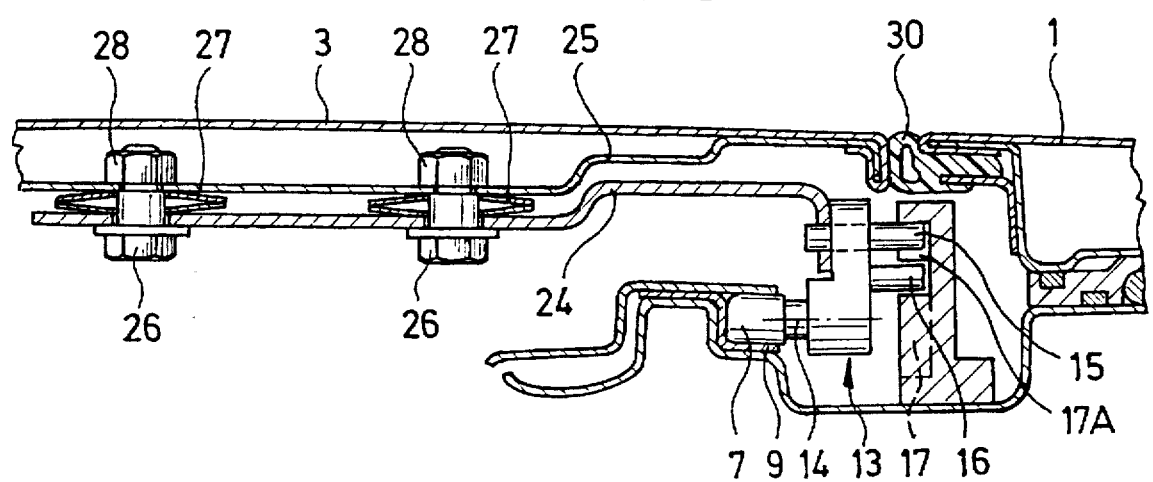
FIG. 9 shows a cross section through the side edge of the cover and the fixed roof to illustrate automatic tolerance compensation.

Since, in a vehicle roof according to the invention, only the areas of the front edge 4 and the lower edge 5 of the cover 3 fit under the fixed roof 1, depending on the curvature of the vehicle roof in the area of the side edges of cover 3, an additional height adjustment can be necessary to achieve a smooth, flush alignment of cover 3 and roof 1 in the closed position of cover 3. To do this, according to FIG. 9, in the area of its side edges, cover 3 is securely joined to an inner sheet 25 of the cover. Cover mechanism 6, for its part, is coupled to a cover carrier 24 which fits under inner sheet 25 of the cover. On the top of inner sheet 25 of the cover, there are weld nuts 28 into which collar screws 26 can be screwed from the bottom of cover carrier 24. Between cover carrier 24 and inner sheet 25 disk springs 27 re-arranged around collar screws 26, so that an elastically prestressed adjustable screwing of inner cover sheet 25 to cover carrier 24 is established to compensate for the mutual height position.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Motor vehicle roof with a cover comprising a cover panel and a cover displacement mechanism by which the cover selectively closes and at least partially exposes an opening in a fixed roof surface, the cover panel having a raised position in which a rear edge thereof is raised above the fixed roof surface and a closed position in which the cover panel rests with a front panel edge and a rear panel edge thereof disposed under the fixed roof surface.

2. Motor vehicle roof according to claim 1, wherein the cover panel exerts a pretensioning force on the fixed roof surface with at least one of the front and rear edges thereof.

3. Motor vehicle roof according to claim 2, wherein said at least one of the front and rear edges of the cover panel has a higher 1 than the areas of the fixed roof surface under which they are disposed.

4. Motor vehicle roof according to claim 3, wherein said at least one of the front and rear edges of the cover panel has a lower stiffness than the areas of the fixed roof surface under which they are disposed.

5. Motor vehicle according to claim 2 wherein the pretensioning force is applied by means of said cover displacement mechanism.

6. Motor vehicle roof according to claim 1, wherein the cover displacement mechanism comprises means for lowering the front and rear edges of the cover panel at the start of the opening movement.

7. Motor vehicle roof with a cover and a cover displacement mechanism by which the cover selective closes and at least partially exposes an opening in a fixed roof surface, the cover having a raised position in which a rear edge thereof is raised above the fixed roof surface and a closed position in which the cover rests with a front edge and a rear edge thereof disposed under the fixed roof surface; and wherein the cover displacement mechanism comprises a means for lowering and moving the cover forward from said closed position and for then raising the rear edge of the cover into said raised position.

8. Motor vehicle roof according to claim 7, wherein the cover displacement mechanism comprises front and rear slide elements which are displaceable along guide rails attached to the fixed roof surface at opposite sides of the cover.

9. Motor vehicle roof according to claim 8, wherein a locking block is provided as a means for automatically coupling and decoupling the front and rear slide elements with each other.

10. Motor vehicle roof according to claim 9, wherein the locking block forms a means for automatically coupling the front slide element to the guide rails when the front and rear slide elements are decoupled.

11. Motor vehicle roof according to claim 8, wherein the cover displacement mechanism further comprises a front pivot lever which is pivotally jointed to the cover at an upper end thereof and is pivotally connected to the front slide element at a lower end thereof and wherein a control pin is located between said upper and lower ends of the pivot lever, said control pin engaging a control cam which is not parallel to the guide rails.

12. Motor vehicle roof according to claim 11, wherein the cover displacement mechanism further comprises a rear pivot lever that has an upper end which fits into a crank slot secured to the cover in a slidable and pivotable manner and that has a rear end which is pivotally connected to the rear slide element, and wherein a rear control pin is located between the upper and rear ends of the rear pivot lever, said rear control pin at least temporarily engages in a rear control cam which has a path that is divergent relative to the guide rails in a first direction of movement along the path and is convergent relative to the guide rails in an opposite second direction.

13. Motor vehicle roof according to claim 12, wherein the front and rear levers are connected at their upper ends to side cover carriers, wherein a cover inside sheet is located on an inner side of the cover, and wherein an elastically prestressed screw connection is disposed between the cover inside sheet and the cover carriers as a means for changing the distance between the cover inside sheet and the cover carriers.

14. Motor vehicle roof according to claim 1, wherein the cover displacement mechanism further comprises a front pivot lever which is pivotally jointed to the cover at an upper end thereof and is pivotally connected to the front slide element at a lower end thereof and wherein a control pin is located between said upper and lower ends of the pivot lever, said control pin engaging a control cam which has a path which is divergent relative to the guide rails in a first direction of movement along the path and is convergent relative to the guide rails in an opposite second direction.

15. Motor vehicle roof according to claim 14, wherein the cover displacement mechanism further comprises a rear pivot lever which has an upper end which fits into a crank slot secured to the cover in a slidable and pivotable manner and has a rear end which is pivotally connected to the rear slide element, and wherein a rear control pin is located between the upper and rear ends of the rear pivot lever, said rear control pin at least temporarily engaging in a rear control cam which has a path which is divergent relative to the guide rails in a first direction of movement the path and is convergent relative to the guide rails in an opposite second direction.

16. Motor vehicle roof according to claim 12, wherein the front and rear levers are connected at their upper ends to side cover carriers; wherein a cover inside sheet is located on an inner side of the cover; and wherein an elastically prestressed screw connection is disposed between the cover inside sheet and the cover carriers as a means for changing the distance between the cover inside sheet and the cover carriers.

* * * * *